US009965606B2

(12) United States Patent
Votaw et al.

(10) Patent No.: US 9,965,606 B2
(45) Date of Patent: May 8, 2018

(54) DETERMINING USER AUTHENTICATION BASED ON USER/DEVICE INTERACTION

(71) Applicant: BANK OF AMERICA CORPORATION, Charlotte, NC (US)

(72) Inventors: Elizabeth S. Votaw, Potomac, MD (US); Alicia C. Jones-McFadden, Fort Mill, SC (US); David M. Grigg, Rock Hill, SC (US); Peter John Bertanzetti, Charlotte, NC (US); Michael E. Toth, Charlotte, NC (US); Carrie Anne Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 220 days.

(21) Appl. No.: 14/928,332

(22) Filed: Oct. 30, 2015

(65) Prior Publication Data

US 2016/0055326 A1 Feb. 25, 2016

Related U.S. Application Data

(63) Continuation-in-part of application No. 14/175,947, filed on Feb. 7, 2014, now Pat. No. 9,185,101.

(51) Int. Cl.
*G06F 21/00* (2013.01)
*H04L 29/06* (2006.01)
(Continued)

(52) U.S. Cl.
CPC ............ *G06F 21/316* (2013.01); *G06F 21/45* (2013.01); *H04L 63/08* (2013.01); *H04L 2463/082* (2013.01)

(58) Field of Classification Search
CPC ....... G06F 21/316; G06F 21/45; H04L 63/08; H04L 2463/082
See application file for complete search history.

(56) References Cited

U.S. PATENT DOCUMENTS 3,256,670 A    6/1966   Ennio
3,295,812 A    1/1967   Ernst
(Continued)

FOREIGN PATENT DOCUMENTS

EP    1132876 A2    9/2001
EP    2645285 A1 * 10/2013 ............. G06F 21/32
(Continued)

OTHER PUBLICATIONS

Hsin-Yi Chiang, Sonia Chiasson; "Improving user authentication on mobile devices: a touchscreen graphical password"; Aug. 2013; MobileHCI '13: Proceedings of the 15th international conference on Human-computer interaction with mobile devices and services; Publisher: ACM; pp. 251-260.*

(Continued)

*Primary Examiner* — Shewaye Gelagay
*Assistant Examiner* — Courtney Fields
(74) *Attorney, Agent, or Firm* — Michael A. Springs; Moore & Van Allen PLLC; Patrick B. Home

(57) ABSTRACT

Embodiments are directed to systems, methods and computer program products for providing user authentication based on historical user patterns. Embodiments of the present invention may be configured to communicate code executable by a computing device that causes the computing device to monitor user patterns of a user based on the user interacting with the computing device; receive baseline user patterns to identify the user; identify, from the baseline user patterns, one or more routine actions performed by the user operating the computing device; receive a request to perform a transaction, wherein the transaction is associated with a level of security that must be authenticated; receive identification user patterns of the user based on the user interacting with the computing device; determine a threshold score
(Continued)

based on comparing the identification user patterns with the baseline user patterns; and alter the level of security.

18 Claims, 7 Drawing Sheets

(51) Int. Cl.
  *G06F 21/31* (2013.01)
  *G06F 21/45* (2013.01)
  *G06F 21/32* (2013.01)
  *H04L 9/32* (2006.01)

(56) References Cited

U.S. PATENT DOCUMENTS

| | | | |
|---|---|---|---|
| 3,295,898 A | 1/1967 | Herman Finzel |
| 4,766,293 A | 8/1988 | Boston et al. |
| 5,437,346 A | 8/1995 | Dumont |
| 5,438,186 A | 8/1995 | Nair et al. |
| 6,119,103 A | 9/2000 | Basch et al. |
| 6,254,000 B1 | 7/2001 | Degen et al. |
| 6,256,670 B1 | 7/2001 | Davies |
| 6,330,546 B1 | 12/2001 | Gopinathan et al. |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,748,367 B1 | 6/2004 | Lee |
| 7,058,806 B2 | 6/2006 | Smeets et al. |
| 7,111,323 B1 | 9/2006 | Bhatia et al. |
| 7,136,835 B1 | 11/2006 | Flitcroft et al. |
| 7,177,838 B1 | 2/2007 | Ling |
| 7,231,202 B2 | 6/2007 | Natsuno |
| 7,239,226 B2 | 7/2007 | Berardi et al. |
| 7,328,189 B2 | 2/2008 | Ling |
| 7,337,144 B1 | 2/2008 | Blinn et al. |
| 7,373,515 B2 | 5/2008 | Owen et al. |
| 7,398,250 B2 | 7/2008 | Blinn et al. |
| 7,472,081 B1 | 12/2008 | Cason |
| 7,529,741 B2 | 5/2009 | Aravamudan et al. |
| 7,546,276 B2 | 6/2009 | Randle et al. |
| 7,596,530 B1 | 9/2009 | Glasberg |
| 7,599,287 B2 | 10/2009 | Testa et al. |
| 7,606,560 B2 | 10/2009 | Labrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,697,920 B1 | 4/2010 | McClain |
| 7,698,221 B2 | 4/2010 | Blinn et al. |
| 7,698,443 B2 | 4/2010 | Yaffe et al. |
| 7,716,180 B2 | 5/2010 | Vermeulen et al. |
| 7,738,382 B2 | 6/2010 | Le Faucheur et al. |
| 7,739,169 B2 | 6/2010 | Hammad |
| 7,742,967 B1 | 6/2010 | Keresman, III et al. |
| 7,783,281 B1 | 8/2010 | Cook et al. |
| 7,784,684 B2 | 8/2010 | Labrou et al. |
| 7,848,980 B2 | 12/2010 | Carlson |
| 7,930,264 B2 | 4/2011 | Geppert |
| 7,988,045 B2 | 8/2011 | Connell, II et al. |
| 7,992,779 B2 | 8/2011 | Phillips et al. |
| 8,012,219 B2 | 9/2011 | Mendez et al. |
| 8,032,932 B2 | 10/2011 | Speyer et al. |
| 8,156,335 B2 | 4/2012 | Lin |
| 8,165,945 B2 | 4/2012 | Collins et al. |
| 8,171,531 B2 | 5/2012 | Buer |
| 8,201,232 B2 | 6/2012 | Zhang et al. |
| 8,214,650 B2 | 7/2012 | Dickinson et al. |
| 8,244,210 B2 | 8/2012 | Ayanamcollil et al. |
| 8,249,805 B2 | 8/2012 | de Silva et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,332,272 B2 | 12/2012 | Fisher |
| 8,346,666 B2 | 1/2013 | Lindelsee et al. |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,395,242 B2 | 3/2013 | Oliver et al. |
| 8,407,142 B1 | 3/2013 | Griggs |
| 8,412,626 B2 | 4/2013 | Hirson et al. |
| 8,423,466 B2 | 4/2013 | Lanc |
| 8,442,915 B2 | 5/2013 | Takatori et al. |
| 8,483,194 B1 | 7/2013 | Wu et al. |
| 8,483,663 B1 | 7/2013 | Jones |
| 8,485,438 B2 | 7/2013 | Dollard |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,601,602 B1 | 12/2013 | Zheng |
| 8,602,602 B2 | 12/2013 | Anaokar et al. |
| 8,620,790 B2 | 12/2013 | Priebatsch |
| 8,644,506 B2 | 2/2014 | Zellner |
| 8,660,358 B1 | 2/2014 | Bergboer et al. |
| 8,682,802 B1 | 3/2014 | Kannanari |
| 8,683,571 B2 | 3/2014 | Zapata et al. |
| 8,732,814 B2 | 5/2014 | Radhakrishnan et al. |
| 8,744,968 B1 | 6/2014 | Grigg et al. |
| 8,768,838 B1 | 7/2014 | Hoffman |
| 8,769,270 B2 | 7/2014 | Orsini et al. |
| 8,788,333 B2 | 7/2014 | Alba et al. |
| 8,788,429 B2 | 7/2014 | Tieken |
| 8,789,162 B2 | 7/2014 | Radhakrishnan |
| 8,839,383 B2 | 9/2014 | Van Horn |
| 8,850,575 B1 | 9/2014 | Magi Shaashua et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 8,997,215 B2 | 3/2015 | Srinivas et al. |
| 9,055,053 B2 | 6/2015 | Radhakrishnan et al. |
| 9,069,943 B2 | 6/2015 | Radhakrishnan et al. |
| 9,185,101 B2 | 11/2015 | Grigg et al. |
| 9,185,117 B2 | 11/2015 | Grigg et al. |
| 9,208,301 B2 | 12/2015 | Grigg et al. |
| 9,213,814 B2 | 12/2015 | Grigg et al. |
| 9,223,951 B2 | 12/2015 | Grigg et al. |
| 9,286,450 B2 | 3/2016 | Grigg et al. |
| 9,305,149 B2 | 4/2016 | Grigg et al. |
| 9,317,673 B2 | 4/2016 | Grigg et al. |
| 9,317,674 B2 | 4/2016 | Grigg et al. |
| 9,331,994 B2 | 5/2016 | Grigg et al. |
| 9,390,242 B2 | 7/2016 | Grigg et al. |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0004866 A1 | 1/2003 | Huennekens et al. |
| 2003/0045328 A1 | 3/2003 | Natsuno |
| 2003/0061170 A1 | 3/2003 | Uzo |
| 2003/0065805 A1 | 4/2003 | Barnes, Jr. |
| 2003/0105714 A1 | 6/2003 | Alarcon-Luther et al. |
| 2003/0163708 A1 | 8/2003 | Tang |
| 2003/0163787 A1 | 8/2003 | Hay et al. |
| 2005/0119978 A1 | 6/2005 | Ates |

(56) References Cited

U.S. PATENT DOCUMENTS

| | | |
|---|---|---|
| 2005/0222961 A1 | 10/2005 | Staib et al. |
| 2006/0030333 A1 | 2/2006 | Ward et al. |
| 2006/0036868 A1 | 2/2006 | Cicchillo |
| 2006/0287004 A1 | 12/2006 | Fuqua |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0223706 A1 | 9/2007 | Gantman et al. |
| 2007/0250920 A1 | 10/2007 | Lindsay |
| 2007/0277232 A1 | 11/2007 | Cates et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0189210 A1 | 8/2008 | Sawhney |
| 2008/0195499 A1 | 8/2008 | Meredith et al. |
| 2008/0293397 A1 | 11/2008 | Gajdos et al. |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0057396 A1 | 3/2009 | Barbour et al. |
| 2009/0076965 A1 | 3/2009 | Elson et al. |
| 2009/0100529 A1 | 4/2009 | Livnat et al. |
| 2009/0117883 A1 | 5/2009 | Coffing et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0241178 A1 | 9/2009 | Burch et al. |
| 2009/0254975 A1 | 10/2009 | Turnbull et al. |
| 2010/0036741 A1 | 2/2010 | Cleven |
| 2010/0064345 A1 | 3/2010 | Bentley et al. |
| 2010/0100897 A1 | 4/2010 | Manuel-Devadoss |
| 2010/0122333 A1 | 5/2010 | Noe |
| 2010/0241571 A1 | 9/2010 | McDonald |
| 2010/0257099 A1 | 10/2010 | Bonalle et al. |
| 2010/0268645 A1 | 10/2010 | Martino et al. |
| 2010/0299262 A1 | 11/2010 | Handler |
| 2010/0312636 A1 | 12/2010 | Coulter et al. |
| 2010/0330958 A1 | 12/2010 | Corda et al. |
| 2011/0004921 A1 | 1/2011 | Homer et al. |
| 2011/0007921 A1 | 1/2011 | Stewart, Jr. et al. |
| 2011/0016534 A1* | 1/2011 | Jakobsson ............ G06F 21/316 726/28 |
| 2011/0022483 A1 | 1/2011 | Hammad |
| 2011/0099104 A1 | 4/2011 | Nybom |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert et al. |
| 2011/0167440 A1 | 7/2011 | Greenfield |
| 2011/0208601 A1 | 8/2011 | Ferguson et al. |
| 2011/0218907 A1 | 9/2011 | Dessert et al. |
| 2011/0251892 A1 | 10/2011 | Laracey |
| 2011/0270618 A1 | 11/2011 | Banerjee et al. |
| 2011/0277016 A1 | 11/2011 | Hockings et al. |
| 2011/0320296 A1 | 12/2011 | Edwards |
| 2012/0030047 A1 | 2/2012 | Fuentes et al. |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0137340 A1 | 5/2012 | Jakobsson et al. |
| 2012/0144461 A1 | 6/2012 | Rathbun |
| 2012/0144468 A1 | 6/2012 | Pratt et al. |
| 2012/0158540 A1 | 6/2012 | Ganti et al. |
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0179558 A1 | 7/2012 | Fischer |
| 2012/0197743 A1 | 8/2012 | Grigg et al. |
| 2012/0197794 A1 | 8/2012 | Grigg et al. |
| 2012/0203700 A1 | 8/2012 | Ornce et al. |
| 2012/0230539 A1 | 9/2012 | Calman et al. |
| 2012/0239576 A1 | 9/2012 | Rose et al. |
| 2012/0252365 A1 | 10/2012 | Lam |
| 2012/0254941 A1 | 10/2012 | Levien et al. |
| 2012/0254943 A1 | 10/2012 | Li |
| 2012/0260318 A1 | 10/2012 | Fromentoux et al. |
| 2012/0265585 A1 | 10/2012 | Muirbrook et al. |
| 2012/0271712 A1 | 10/2012 | Katzin et al. |
| 2012/0290482 A1 | 11/2012 | Atef et al. |
| 2012/0300938 A1 | 11/2012 | Kean et al. |
| 2012/0316963 A1 | 12/2012 | Moshfeghi |
| 2012/0316992 A1 | 12/2012 | Obome |
| 2012/0317034 A1 | 12/2012 | Guha et al. |
| 2012/0323783 A1 | 12/2012 | Canetto |
| 2012/0330846 A1 | 12/2012 | Light et al. |
| 2013/0007874 A1 | 1/2013 | Purvis |
| 2013/0013498 A1 | 1/2013 | Fisher et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0036048 A1 | 2/2013 | Campos et al. |
| 2013/0042314 A1 | 2/2013 | Kelley |
| 2013/0054336 A1 | 2/2013 | Graylin |
| 2013/0054470 A1 | 2/2013 | Campos et al. |
| 2013/0060689 A1 | 3/2013 | Oskolkov et al. |
| 2013/0060708 A1 | 3/2013 | Oskolkov et al. |
| 2013/0085927 A1 | 4/2013 | Scott |
| 2013/0097682 A1 | 4/2013 | Zeljkovic et al. |
| 2013/0097683 A1* | 4/2013 | Davis ...................... G06F 21/88 726/7 |
| 2013/0097684 A1 | 4/2013 | Kim |
| 2013/0102283 A1 | 4/2013 | Lau et al. |
| 2013/0110658 A1 | 5/2013 | Lyman et al. |
| 2013/0111208 A1 | 5/2013 | Sabin et al. |
| 2013/0124346 A1 | 5/2013 | Baldwin et al. |
| 2013/0143621 A1 | 6/2013 | Kumaran |
| 2013/0159178 A1 | 6/2013 | Colon et al. |
| 2013/0166332 A1 | 6/2013 | Hammad |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179341 A1 | 7/2013 | Boudreau |
| 2013/0179954 A1 | 7/2013 | Bidare |
| 2013/0188485 A1 | 7/2013 | Midani et al. |
| 2013/0191227 A1 | 7/2013 | Pasa et al. |
| 2013/0198056 A1 | 8/2013 | Aldrey et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0219454 A1 | 8/2013 | Hewinson |
| 2013/0219473 A1 | 8/2013 | Schaefer |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0267204 A1 | 10/2013 | Schultz et al. |
| 2013/0268437 A1 | 10/2013 | Desai et al. |
| 2013/0290361 A1 | 10/2013 | Anderson et al. |
| 2013/0304651 A1 | 11/2013 | Smith |
| 2013/0318627 A1 | 11/2013 | Lundkvist et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |

(56) References Cited

U.S. PATENT DOCUMENTS

| | | |
|---|---|---|
| 2014/0025958 A1 | 1/2014 | Calman |
| 2014/0058938 A1 | 2/2014 | McClung, III |
| 2014/0096215 A1 | 4/2014 | Hessler |
| 2014/0123244 A1 | 5/2014 | Resch et al. |
| 2014/0129357 A1 | 5/2014 | Goodwin |
| 2014/0130127 A1 | 5/2014 | Toole et al. |
| 2014/0143145 A1 | 5/2014 | Kortina et al. |
| 2014/0143149 A1 | 5/2014 | Aissi |
| 2014/0172707 A1 | 6/2014 | Kuntagod et al. |
| 2014/0173704 A1 | 6/2014 | Adams et al. |
| 2014/0187148 A1 | 7/2014 | Taite et al. |
| 2014/0188719 A1 | 7/2014 | Poomachandran et al. |
| 2014/0195425 A1 | 7/2014 | Campos et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0245411 A1 | 8/2014 | Meng et al. |
| 2014/0250009 A1 | 9/2014 | Carlson |
| 2014/0279270 A1 | 9/2014 | Bertanzetti et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0359709 A1 | 12/2014 | Nassar et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0100788 A1 | 4/2015 | Chastain et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0171049 A1 | 6/2015 | Wasserman et al. |
| 2015/0206131 A1 | 7/2015 | Phillips et al. |
| 2015/0206137 A1 | 7/2015 | Mazarim Fernandes |
| 2015/0213474 A1 | 7/2015 | Howe |
| 2015/0220914 A1 | 8/2015 | Purves et al. |
| 2015/0227924 A1 | 8/2015 | Grigg et al. |
| 2015/0227926 A1 | 8/2015 | Grigg et al. |
| 2015/0229625 A1 | 8/2015 | Grigg et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |

FOREIGN PATENT DOCUMENTS

| | | |
|---|---|---|
| WO | 2012058099 A1 | 5/2012 |
| WO | 2013095486 A1 | 6/2013 |

OTHER PUBLICATIONS

Final Office Action dated Aug. 27, 2015. U.S. Appl. No. 14/175,701.

Lane, "History of APIs"; APIEvangelist.com; Dec. 2012, 11 pages.

OThru.com. "QThru: use your mobile smartphone for self-checkout." http://www.qthru.com/. QThru.com © 2011. 6 pages. Retrieved Mar. 22, 2013.

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

Simon, "Credit-Card Reward Programs: A Short History"; Creditcards.com, Nov. 2006, 4 pages.

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/5B10001424052748703421204576329253050637400.html. 5 pages. Retrieved Mar. 22, 2013.

\* cited by examiner

DETERMINING USER AUTHENTICATION BASED ON USER/DEVICE INTERACTION

CROSS REFERENCE TO RELATED APPLICATION(S)

This application claims priority to and is a continuation-in-part of U.S. patent application Ser. No. 14/175,947 filed Feb. 7, 2014 and entitled USER AUTHENTICATION BASED ON HISTORICAL USER BEHAVIOR; the contents of which are also incorporated herein by reference.

BACKGROUND

In the new technological age, the security of personal information, or the lack thereof, has become an issue that concerns many people. As a result, several business industries, such as financial institutions, have taken precautionary measures to ensure the safety and protection of their customers' information. This is typically accomplished by verifying a user's identity prior to performing a function or transaction on behalf of a user.

BRIEF SUMMARY

Embodiments of the invention provide are directed towards systems, methods, and computer program apparatuses for authenticating users based on historical user patterns of the user while physically interacting with a computing device. In authenticating the user, the present invention may communicate, to a computing device, code executable by the computing device that causes the computing device to monitor user patterns of a user based on the user physically interacting with the computing device. Based on the computing device executing the code, the system may be configured to receive a baseline set of physical user patterns of the user for identifying the user. The system may then identify, from the baseline set of physical user patterns, one or more routine actions performed by the user while operating the computing device.

In some embodiments of the invention, the invention receives, from the user, a request to perform a transaction using the computing device. The transaction may be associated with a level of security that must be authenticated prior to completing the transaction.

Based on receiving the request from the user to perform a transaction, the invention may be configured to receive, from the computing device, an identification set of physical user patterns of the user based on the user physically interacting with the computing device. Based on comparing the identification set of physical user patterns with the baseline set of physical user patterns, the invention may be configured to determine a threshold score. And based on such threshold score, the system is configured to alter the level of security that must be authenticated prior to completing the transaction.

In other embodiments of the invention, the level of security that must be authenticated prior to completing the transaction is one of a hard authentication and a soft authentication. The hard authentication comprises two or more authentication credentials. The soft authentication comprises one authentication credential.

In other embodiments of the present invention, altering the level of security that must be authenticated prior to completing the transaction comprises changing the level of security. If the level of security is the hard authentication, from the hard authentication to the soft authentication. Alternatively, if the level of security is the soft authentication, the invention may be configured to change the level of security to no authentication.

In other embodiments of the invention, the threshold score is associated with one of a fully authenticated tier, a partially authenticated tier, and no authenticated tier. Altering the level of security when the threshold score is associated with the fully authenticated tier comprises requiring no authentication credentials prior to performing the transaction. Altering the level of security when the threshold score is associated with the fully authenticated tier comprises requiring at least a partial number of the authentication credentials associated with the level of security prior to completing the transaction. Altering the level of security when the threshold score is associated with the fully authenticated tier comprises requiring all of the authentication credentials associated with the level of security and at least one other authentication credential not associated with the level of security.

In yet other embodiments of the present invention, the invention may be configured to communicate a request for the user to submit a response to one or more credentials associated with the level of security. After communicating the request, the invention may receive the response to the one or more credentials associated with the level of security. The invention may then authenticate the user based on validating the response to the one or more credentials associated with the level of security. Finally, the invention may perform the transaction based on authenticating the user.

In some embodiments of the invention, the user patterns of the user comprise at least one of a time of day when the user physically interacts with the computing device or specific applications stored on the computing device that the user accesses, an order in which the user accesses the specific applications stored on the computing device, a manner in which the user performs correction of typing errors, an angle at which the user holds the computing device captured by the computing device using an accelerometer, contacts stored on the computing device, and the like.

In other embodiments of the invention, the invention may be configured to update the baseline set of physical user patterns using the identification set of physical user patterns based on receiving validating one or more authentication credentials associated with the level of security.

In yet another embodiment of the invention, the invention may be configured to receive from a user, a request to execute at least one user action from a plurality of user actions associated with an application. Execution of the at least one user action requires validation of one or more authentication credentials.

The invention may collect a set of data comprising information related to one or more physical user patterns. Such physical user patterns may be based on the user initially physically interacting with an apparatus. Based on the collected set of data, the invention may determine a normal pattern of usage.

After determining the normal pattern of usage of the user, the invention may then determine a present pattern of usage. The present pattern of usage may be based again on the user physically interacting with the apparatus.

Using the normal pattern of usage and the present pattern of usage, the invention may determine a user pattern score of the user. The invention may determine the user pattern score by comparing the present pattern of usage to the normal pattern of usage. By using such a comparison, the invention may determine that the present pattern of usage is outside the normal pattern of usage. The invention sets the user pattern score by determining an extent to which the present pattern of usage is outside the normal pattern of usage.

Using the determined user pattern score, the invention may determine a level of security associated with the determined user pattern score and further determine which one or more authentication types from a plurality of authentication types are associated with the level of security associated with the user pattern score.

Based on the level of security, the invention may request one or more authentication credentials corresponding to the determined one or more authentication types and may receive one or more authentication credentials from the user. The invention may validate the one or more authentication credentials, thereby resulting in a successful validation of the one or more authentication credentials.

In response to the successful validation of the one or more authentication credentials, the invention may execute the at least one user action.

BRIEF DESCRIPTION OF THE DRAWINGS

Figure 1A:
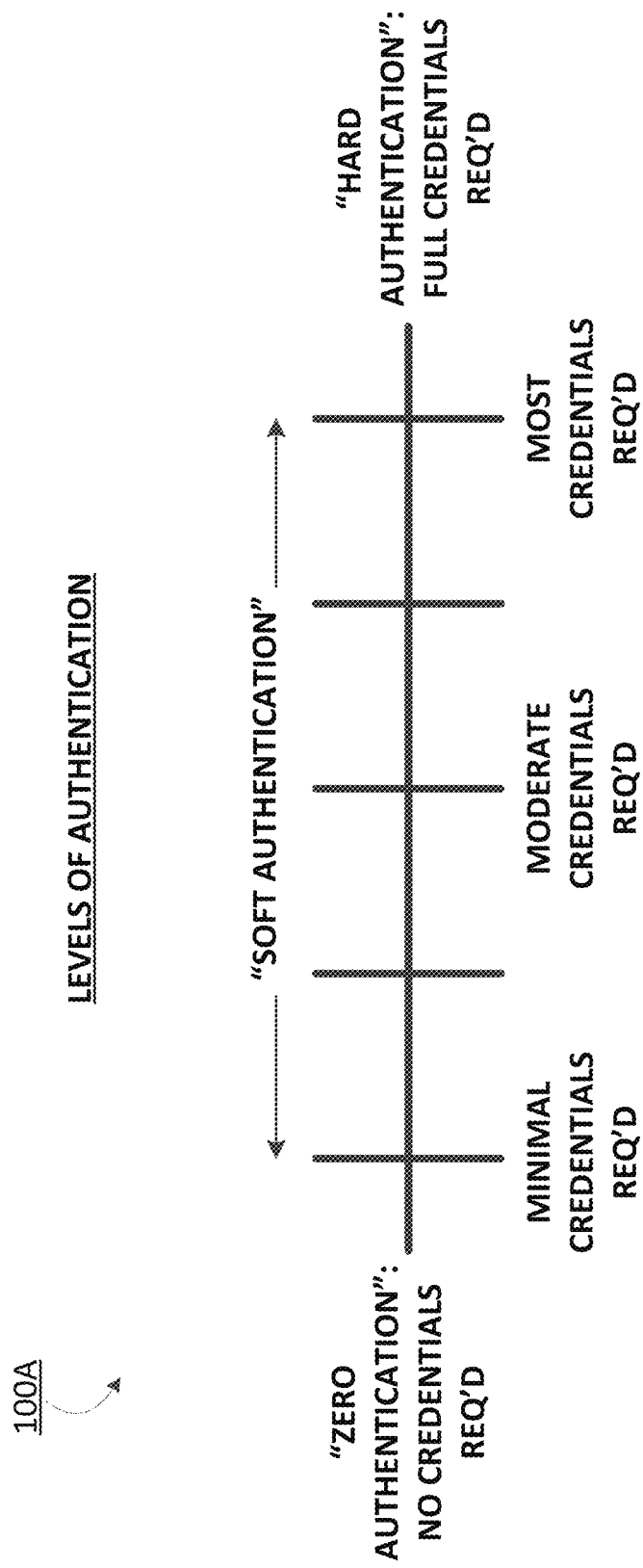
Figure 1B:
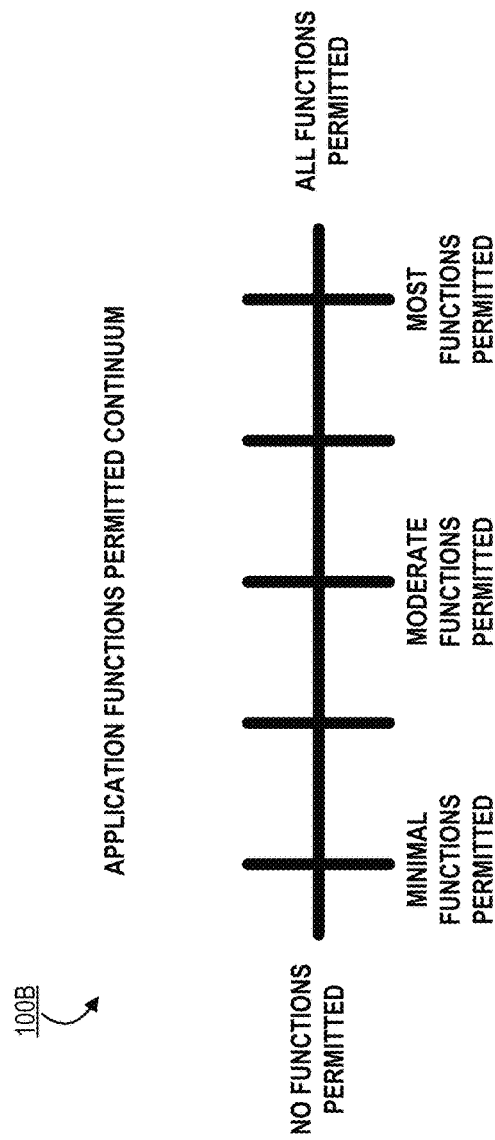
Figure 1C:
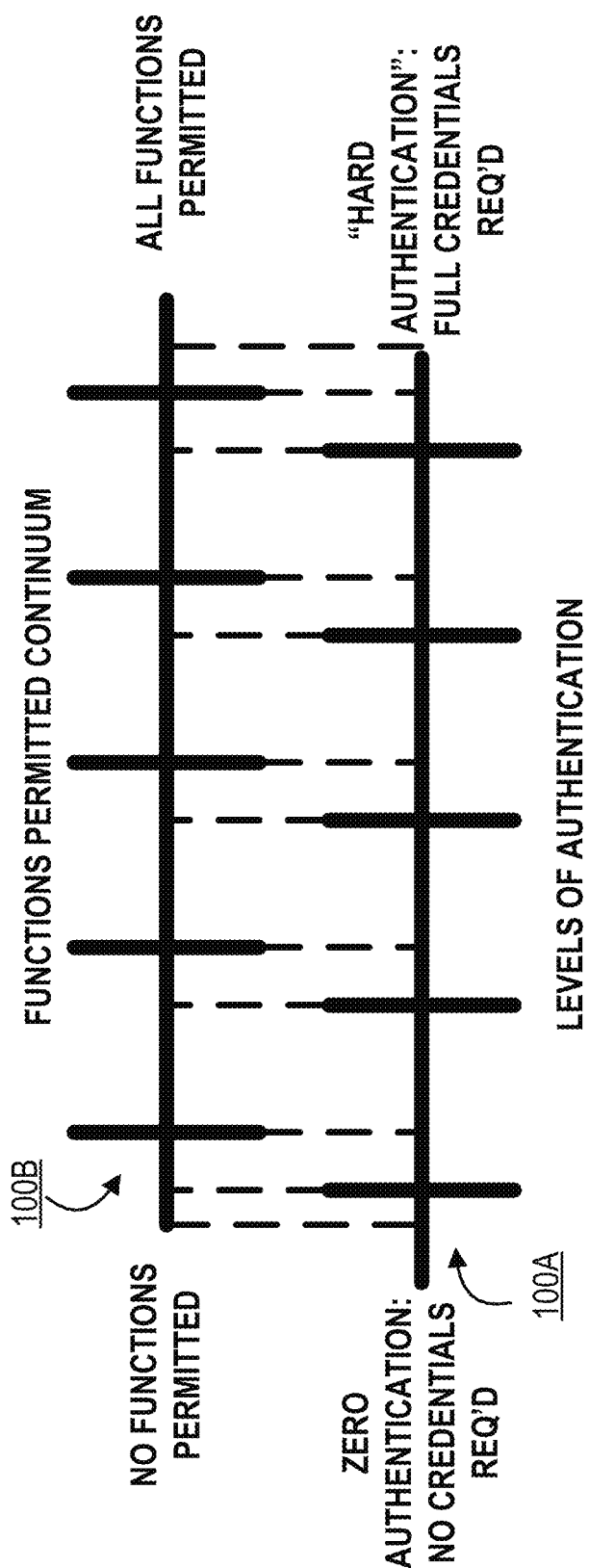
Figure 2:
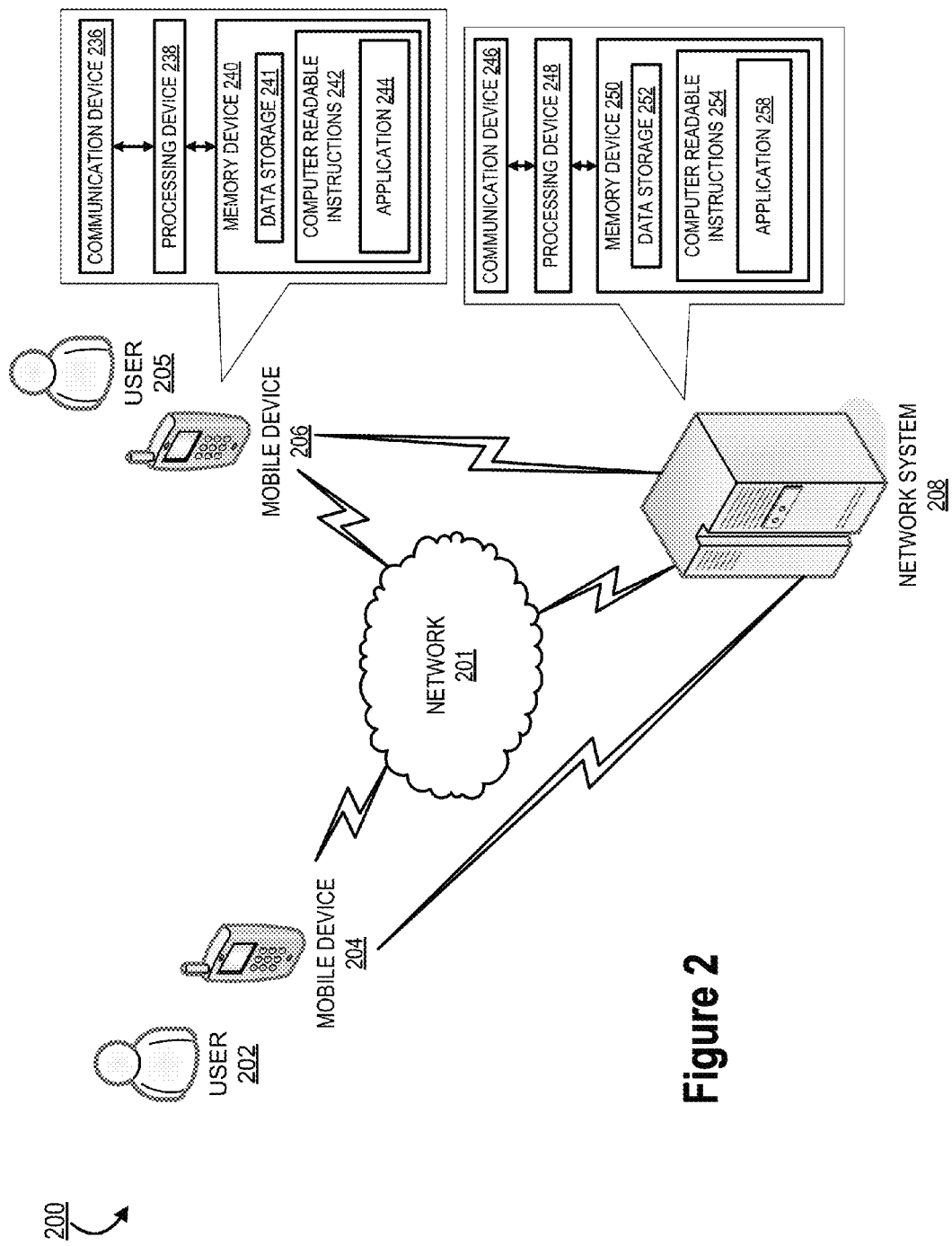
Figure 3A:
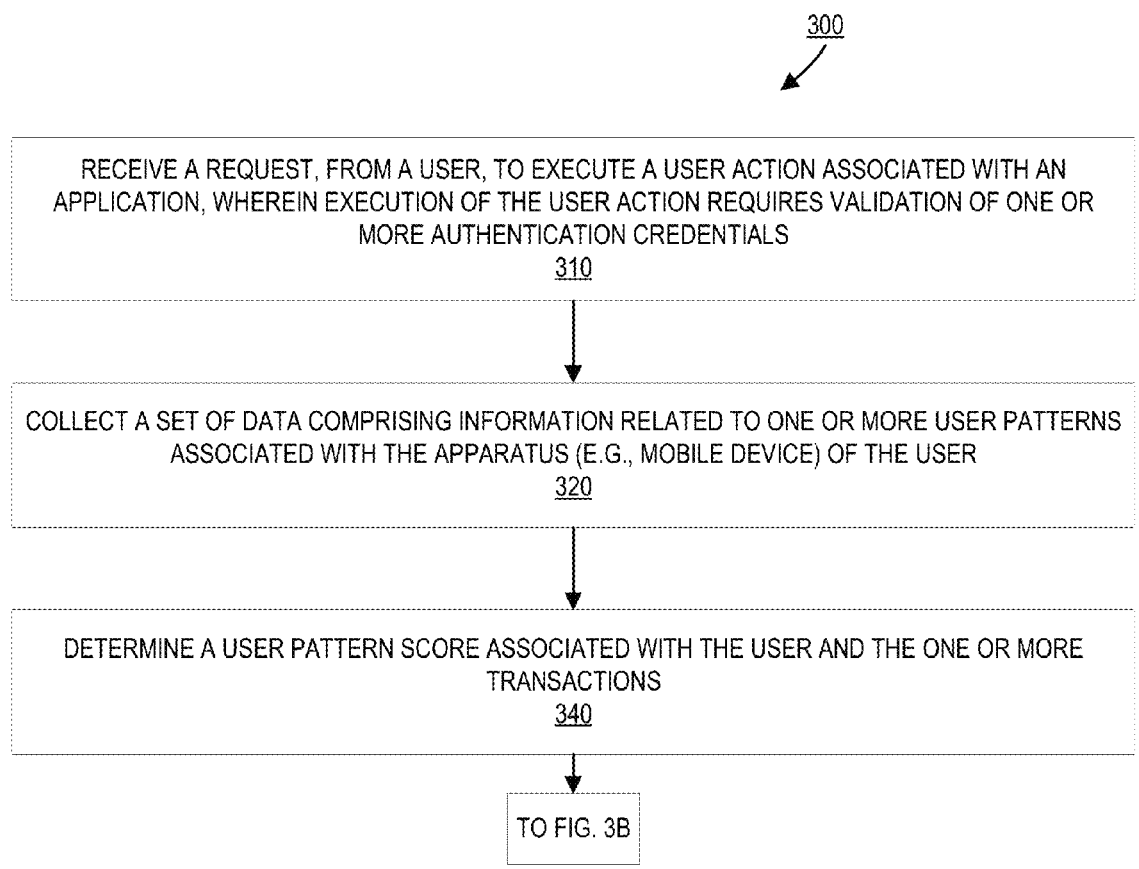
Figure 3B:
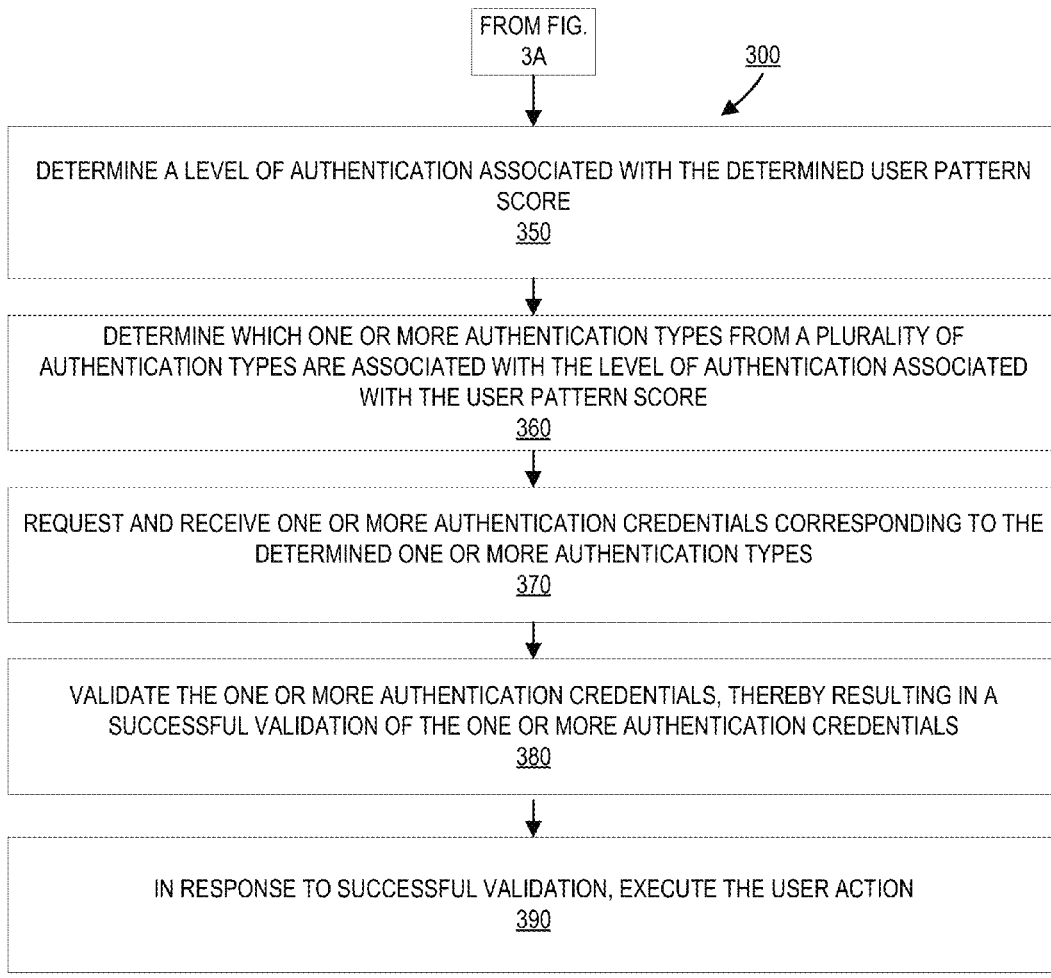
Figure 4:
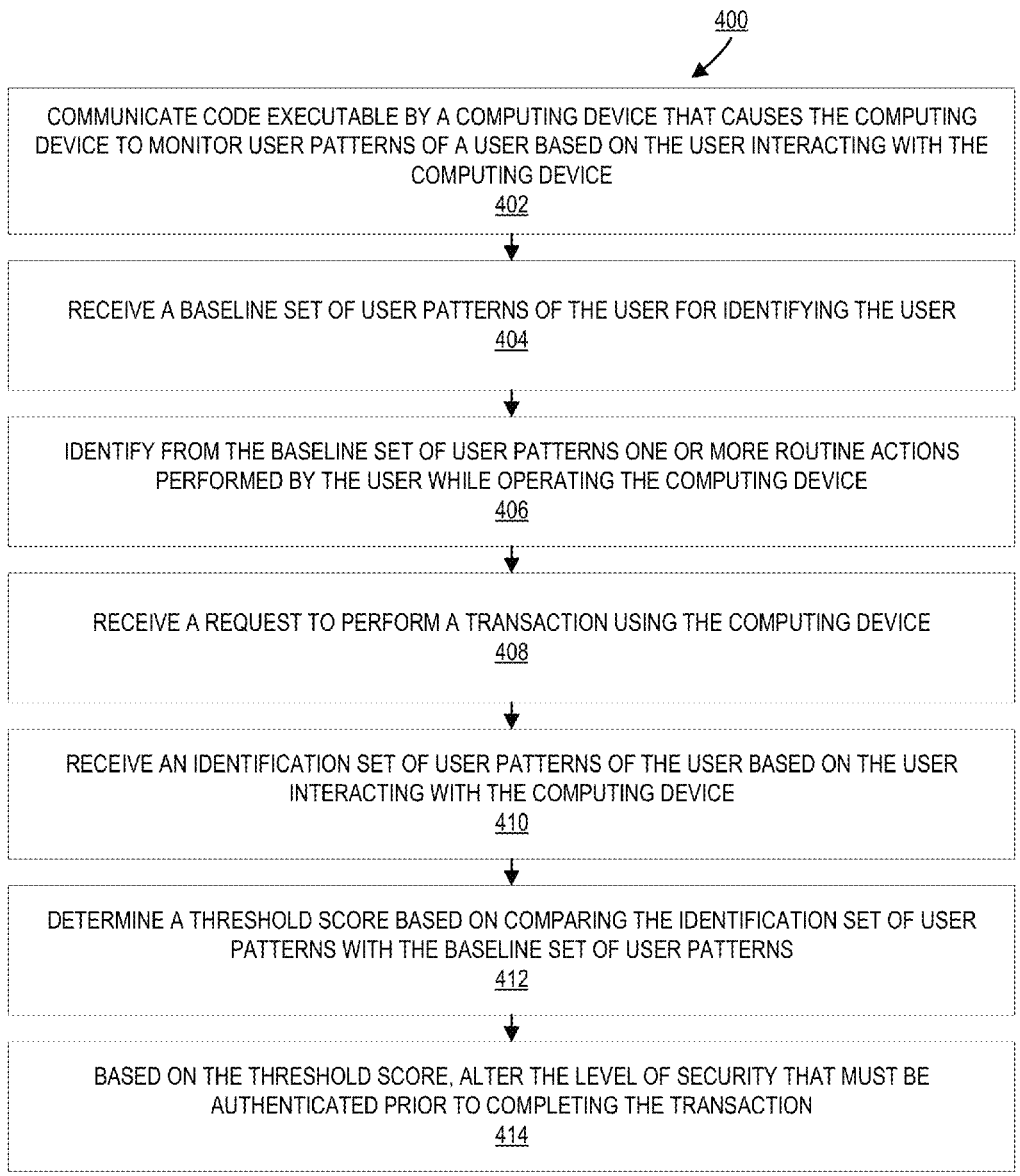

Having thus described embodiments of the invention in general terms, reference will now be made to the accompanying drawings, where:

FIG. 1A provides a diagram illustrating an authentication continuum, in accordance with an embodiment of the present invention;

FIG. 1B provides a diagram illustrating an application functions permitted continuum, in accordance with an embodiment of the present invention;

FIG. 1C provides a diagram illustrating multiple continuums, in accordance with an embodiment of the present invention;

FIG. 2 provides a diagram illustrating a network environment for providing authentication using previously-validated authentication credentials, in accordance with an embodiment of the present invention;

FIGS. 3A and 3B provides a flow diagram illustrating a method for user authentication based on transaction data, in accordance with embodiments of the invention; and FIG. 4 provides a provides a flow diagram illustrating a method for user authentication based on the user interacting with a computing device, in accordance with embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 1A, a continuum of authentication 100A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 1C, the continuum of authentication 100A may be coupled with an application functions permitted continuum 100B, first illustrated in FIG. 1B.

Referring to FIG. 1B, the application functions permitted continuum 100B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/or number of functions that are permitted and/or the context in which certain functions are permitted.

Referring now to FIG. 1C, a diagram 100C illustrates a coupling of the application functions permitted continuum 100B and the levels of authentication continuum 100A. As shown, the continua 100B and 100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 100B provides that a particular function or functions may be permitted given that a specified level of authentication credentials are supplied, as indicated by the corresponding point on continuum 100A. For example, a financial institution and/or a user may arrange the continua 100B and 100A with respect to one another and may adjust the arrangement based on changing desires or goals.

In some embodiments, one or both the continua 100B and 100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 2, a network environment 200 is illustrated in accordance with one embodiment of the present invention. As illustrated in FIG. 2, the network system 208 is operatively coupled, via a network 201 to the mobile device 204 and/or 206. In this configuration, the network system 208 may send information to and receive information from the mobile device 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may perform a user authentication by performing one or more of the steps and/or sub-steps discussed herein.

As illustrated in FIG. 2, the mobile device 206 generally comprises a communication device 236, a processing device 238, and a memory device 240. The processing device 238 is operatively coupled to the communication device 236 and the memory device 240. In some embodiments, the processing device 238 may send or receive data from the mobile device 204, and/or the network system 208 via the communication device 236 over a network 201. As such, the communication device 236 generally comprises a modem, server, or other device for communicating with other devices on the network 201.

As further illustrated in FIG. 2, the mobile device 206 comprises computer-readable instructions 242 stored in the memory device 240, which in one embodiment includes the computer-readable instructions 242 of an application 244. In the embodiment illustrated in FIG. 2, the application 244 allows the mobile device 206 to be linked to the network system 208 to communicate, via a network 201. The application 244 may also allow the mobile device 206 to connect directly (i.e., locally or device to device) with the mobile device 204 for proximity services (e.g., using either cellular based links or non-cellular based links). The application 244 may perform a user authentication by performing one or more of the steps and/or sub-steps discussed herein.

It is understood that the servers, systems, and devices described herein illustrate one embodiment of the invention. It is further understood that one or more of the servers, systems, and devices can be combined in other embodiments and still function in the same or similar way as the embodiments described herein.

Various embodiments of the invention retrieve historical patterns of user behavior and compare them to the current situation. In particular, the system may require a lower level of authentication if it confirms information indicating that the user attempting to access an account or perform some other function/action is likely to be the customer based on the historical pattern of the customer.

For example, a customer may typically make 2-4 phone calls in the morning and 2-4 phone calls in the afternoon on a weekday, but the user of the mobile device has not done so in the last 24 hours. Such a fact may indicate that someone who makes a request for an action from the user's mobile device is less likely to be the user, and therefore, a harder or higher level of authentication may be required for the requested action.

In various embodiments, any action performed by the user on the mobile device may be patterned to determine normal patterns of the user and then used in comparison to currents patterns of use leading up to a request for an action/function. Examples of other actions that may be patterned include text messaging, emails sent from the mobile device, web surfing and the like.

In the event that a user making a request has behavior that falls outside predetermined thresholds for normal behavior, then a higher level of authentication will be required. In some embodiments, multiple characteristics or patterns of the user may be analyzed to determine a number of characteristics that fall within or outside predetermined thresholds indicating a normal usage of the user. For example, if the system considers ten characteristic patterns of the user, and 9/10 of them are within normal patterns, then a soft authentication may be required for the requested action. On the other hand, if the system considers ten characteristic patterns of the user, and 2/10 of them are within normal patterns, then a hard authentication may be required for the requested action.

In some embodiments, the extent to which the user is outside normal patterns may be considered in determining the level of authentication required. For example, if the user typically makes 25 phone calls in one day and has not made any phone calls, then the level of authentication may be moved very high or hard due to the great difference between the normal pattern and the actual behavior of the user.

Referring now to FIG. 3A, a flowchart illustrates a method 300 for user authentication based on transaction data. The first step, represented by block 310, is to receive a request, from a user, to execute a user action associated with an application, where execution of the user action requires validation of one or more authentication credentials. Typically, the application may include one or more user actions or functions. For example, a mobile financial application may include functions such as a funds transfer, a check deposit, a balance check, a bill pay, or the like. In another example, the user action may be checking account balance, executing a money transfer, initiating a bill pay to a merchant, or the like.

The next step, represented by block 320, is to collect a set of data comprising information related to one or more user patterns associated with the apparatus (e.g., mobile device) of the user. The set of data may include data regarding power cycles, application access/requests, communications sent and/or received such as SMS messages, text messages, emails, phone calls made, charging times and durations, movement and/or location of the apparatus and/or the like.

The movement and/or location of the apparatus may be determined in a variety of ways such as by collecting a set of data comprising information related to a physical location of the user. This set of data may be collected from a variety of sources and may include data drawn from one or more of the sources. The set of data may include positioning data of the customer, consistent with embodiments of the present invention.

The positioning data may include global positioning data. Global positioning data may include any information collected from methods, systems, apparatus, computer programs etc. involving locating a user's position relative to satellites, fixed locations, beacons, transmitters or the like. In some instances, global positioning data may be collected from a GPS device, such as a navigation system. Such a navigation system may be, but is not limited to, hardware and/or software that are part of a mobile phone, smartphone, PDA, automobile, watch etc. or a commercially available personal navigation system or the like. The amount, nature and type of the global positioning data that is collected may depend on the merchant's relationship with the customer and the amount of information that the customer has authorized the merchant or third-party provider to collect.

For instance, in some embodiments, the global positioning data will be snapshots of the user's location at different times. For example, a snapshot of the user's location may be collected each time the GPS software, navigation system or application is activated. The global positioning data may also include the destination entered by the user, recent searches for locations, attractions, addresses etc. In other instances, the global positioning data may be the complete route being provided to the GPS system's user, including destination, route, alternate routes, anticipated time of arrival etc. In some such embodiments, the global positioning data may include an indication if the customer selects a detour from a previously selected route, or instructs the navigation system to reach the desired location taking specific roads or avoiding certain roads.

Positioning data of the customer may include mobile device data. Mobile device data may include information regarding the location of the customer's mobile device. Such a mobile device may include, but is not limited to, a cellular telecommunications device (i.e., a cell phone or mobile phone), personal digital assistant (PDA), smartphone, a mobile Internet accessing device, or other mobile device including, but not limited to portable digital assistants (PDAs), pagers, gaming devices, laptop computers, tablet computers, and any combination of the aforementioned, or the like. For instance, the location of the mobile phone may be dynamically determined from the cell phone signal and cell towers being accessed by the mobile phone. In other instances, a mobile device may include software or hardware to locate the position of the mobile phone from GPS signals, wireless network locations, and the like. Mobile device data may further include information from an accelerometer that is a part of the mobile device and provides information regarding whether the mobile device is moving, and if so, in what direction. In some embodiments, mobile device data may be the time and location of calls placed using the telephone functionality of a mobile device. In yet other embodiments, the mobile device data may be data collected and analyzed by the hardware and/or software of the mobile device concerning the surrounding environment. In such embodiments, hardware, such as a video capture device, camera or the like and software that is stored in the memory of a mobile device captures a video stream of the environment surrounding the mobile device and through object recognition, compass direction, the location of the mobile device, and other such data identifies information about the objects identified in the surrounding environment and/or the environment itself. For example, in use, a user may use the camera built into her smartphone to collect a real-time video stream that includes images of the façade of a store front and the surrounding area. This image may include the store's name from a marquee, a street address (collected from an image of the numbers on the building and of street signs in the video image) and the direction the smartphone is facing (from a compass in the mobile device). Such information may be sufficient to locate the user's position and potentially the direction the user is facing and/or traveling.

Positioning data of the customer may also be collected from social network data. It will also be understood that "social network" as used herein, generally refers to any social structure made up of individuals (or organizations) which are connected by one or more specific types of interdependency, such as kinship, friendship, common interest, financial exchange, working relationship, dislike, relationships, beliefs, knowledge, prestige, geographic proximity etc. The social network may be a web-based social structure or a non-web-based social structure. In some embodiments, the social network may be inferred from financial transaction behavior, mobile device behaviors, etc. The social network may be a network unique to the invention or may incorporate already-existing social networks as well as any one or more existing web logs or blogs, forums and other social spaces. Social network data may indicate the customer's recent, present or future location through expressed data. For instance, a user may upload a blog post, comment on a connection's page, send a friend an electronic message etc. that she is traveling to a specific location or that she is currently in a specific city, or on a specific road etc.

Moreover, many already-existing social networks provide users with the ability to "check-in", "flag" or otherwise indicate the user's current location. Accordingly, customer positioning data collected from social networking data may consist of such indications. Furthermore, many social networks allow users to rate, like, comment etc. on restaurants, attractions, locations and the like. Accordingly, a customer may indicate that she ate at a certain restaurant or business at a given time and thereby provide information about her location at that time. Furthermore, a customer may upload photographs to a social networking site and thereby provide information about the customer's location. In some instances the customer's location may be determined from the picture, (for example a picture of a state line sign, a highway sign, a mile marker etc.) or a caption associated with the picture may indicate the customer's location and/or the time the photo was taken.

Positioning data of the customer may also be collected from Internet data. Internet data, may include any information relating to the searches conducted by the customer, website's visited by the customer and the like that suggests the customer's present or future location(s). For instance, in preparing for a vacation a customer may conduct searches for hotels, restaurants or activities in the area where the customer will be staying. Similarly, a customer may review weather forecasts for locations other than her place of residence indicating that she may soon be traveling to that location. A customer may also search for construction or traffic reports indicating future travel along certain roads. Moreover, changes in search patterns may suggest a customer's future location. For instance if a customer usually uses a web browser application just to read online news articles or to check sports scores but suddenly begins to search for camping gear, hiking manuals and boots it may be indicative that the customer is anticipating taking a hiking trip and will be traveling away from her home area. It will be understood that such Internet data may relate to searches or websites visited by the customer before she began traveling, however, inasmuch as many mobile devices also include mobile Internet connectivity, it will also be understood that such information may be dynamically collected as the customer travels.

The next step, represented by block 340, is to determine a user pattern score associated with the user. The user pattern score is a quantification or how close the user's current pattern(s) of behavior are to historical pattern(s) of behavior, and therefore, indicates a relative level of potential exposure for a user request. Methods for determining the user pattern score are discussed below.

Referring now to FIG. 3B, the next step, represented by block 350, is to determine a level of authentication associated with the determined user pattern score. Then, the system may be configured to determine which one or more authentication types from a plurality of authentication types are associated with the level of authentication associated with the user pattern score, as shown in block 360. As illustrated in at least FIG. 1A, the one or more authentication levels may include a hard authentication, a soft authentication, and a zero authentication. In one aspect, the authentication types may include a username, a password, a personal identification number, biometric data, or the like. In some embodiments, each authentication level may include one or more authentication types in the continuum of authentication.

In response to determining one or more authentication types, the system may be configured to request one or more authentication credentials corresponding to the determined one or more authentication types, as shown in block 370. In response to requesting one or more authentication credentials, the system may be configured to receive one or more authentication credentials from the user and validate the one or more authentication credentials, thereby resulting in a successful validation of the one or more authentication credentials, as shown in blocks 370 and 380. In response to successful validation of the one or more authentication credentials, the system may then be configured to execute the user action, as shown in block 390. In one aspect, a successful validation may include determining a successful match between the one or more authentication credentials received from the user and the one or more authentication credentials stored in a database, wherein the one or more authentication credentials correspond to the one or more authentication types associated with the level of authentication.

Determining the user pattern score (see FIG. 3, block 340) may be done in a variety of methods. For example, in some embodiments, determining the user pattern score includes determining a threshold associated with one or more apparatus activities, determining whether a current pattern of the user is within the threshold, and, based at least in part on the determination, assigning the user pattern score. The threshold(s) may be predetermined by the financial institution and/or may be predetermined and/or modified by the customer, such as by using the customer's online banking access.

In some embodiments, determining the user pattern score includes selecting one or more second apparatus activities and determining a second threshold associated with the one or more second user patterns, determining whether the user is within the second threshold, where determining the user pattern score is further based at least in part on the determination of whether the user is within the second threshold.

In some embodiments, determining the user pattern score includes determining a first partial score based at least in part on the determination of whether the user is within the threshold, where the first partial score is weighted by a first weighting factor and determining a second partial score based at least in part on the determination of whether the user is within the second threshold, and where the second partial score is weighted by a second weighting factor. The partial scores may then be combined such as by summing or multiplying to determine the user pattern score.

The weighting factors may represent one or more user-defined preferences regarding their respective apparatus activities such as indicating which activities should be weighted more heavily.

In some embodiments, determining the user pattern score includes determining a historical user pattern associated with the user, determining whether the set of data indicates a current pattern that falls within a predetermined acceptable variance of the historical pattern, and, if not, determining the user pattern score based at least in part on a variance of the current pattern from the historical pattern. In some embodiments, determining the user pattern score comprises determining a historical pattern associated with the user and determining the user pattern score based at least in part on a variance of the current pattern from the historical pattern.

In various embodiments, the user pattern score may be looked up in a database to determine a corresponding level of authentication required for the user pattern score. In some cases, certain ranges of user pattern scores are assigned a particular level of authentication. In some cases, these levels of authentication are managed and predetermined by the financial institution and in some cases, the user/customer may either modify already predetermined levels of authentication and/or set the predetermined levels of authentication.

In various embodiments, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

Referring now to FIG. 4, a flowchart illustrates a method 400 for user authentication based on the user physically interacting with a computing device. The first step, represented by block 402, is to communicate, to a computing device, code executable by the computing device that causes the computing device to monitor user patterns of the user. The computing device may be a mobile device of the user, such as a mobile phone, a smart phone, an MP3 player, a digital organizer, and the like. Additionally, the computing device might also refer to another computing device such as a desktop or a laptop computer. In all cases, the computing device will comprise an ability to process instructions received for the purpose of monitoring user patterns of the user while the user physically interacts with the computing device. In some embodiments, the set of instructions may be a program that is installed on the computing device, such as an application on a mobile device. In other embodiments, the set of instructions may be a script that is executed by a scripting engine installed on the computing device. In all embodiments, the set of instructions cause the computing device to monitor user patterns of the user while the user is physically interacting with the computing device.

The user patterns may include many different routine actions performed by the user while interacting with the computing device. In some embodiments, the routine actions may include monitoring a time of the day which the user physically interacts with the computing device. For example, where the computing device is a mobile device, monitoring may be performed to determine at what times of the day the user may unlock the computing device. In other embodiments, monitoring may be performed over a given period of time to determine how many times during period the user unlocks the computing device. For example, the user might unlock a mobile device multiple times in the morning after waking up, but fewer times throughout the day.

In other embodiments, the routine actions may include determining with which applications the user tends to interact. For example, a user may open an email application an average number of times each day. Further, monitoring may be performed to determine an order in which the user accesses given applications. For example, the user may access an email application followed by a weather application, and then followed by a news application.

In yet other embodiments, monitoring may be performed using hardware or sensors of the computing device. The sensors or hardware may include, but is not limited to accelerometers, location sensors (e.g. global positioning system device), light sensors, and the like. Where a computing device includes an accelerometer, the accelerometer may sense an angle at which the computing device is held. Thus, monitoring may be performed to determine an angle which the user typically holds the computing device or a preferred orientation of the computing device (e.g. portrait or landscape). The accelerometer may further be used to determine adjustments of the computing device based on personal comfort of the user. For example, a given user may switch sitting positions multiple times each hour. Monitoring may be performed to determine how many times the user switches the sitting position and the typical sitting positions of the user.

In yet other embodiments, monitoring may be performed to determine how a user corrects typing errors on a computing device. Typically, a user might utilize multiple methods in correcting typing errors. These methods might include autocorrect, prompt correction, and delayed correction. In autocorrect, the computing device determines that a word is misspelled and performs an automatically changes the word to a correctly spelled word. A prompt correction includes the user identifying the word is misspelled immediately after spelling and either highlighting the misspelled word or backspacing to correct the word. In delayed correction, the user may wait until typing a sentence, a paragraph, or an entire document and correcting all the misspelled words at one time. Monitoring may be performed to determine which method the user typically performs. Where monitoring results in determining that the user favors prompt correction of misspelled words, further monitoring may be performed to determine whether the user favors highlighting the misspelled word or backspacing to correct the misspelled word.

Where the user favors autocorrect, monitoring may be performed to determine which words the user typically misspells and requires and correction. When a user is typing, monitoring may result in key words which the user typically misspells and words that the user typically spells correctly.

In yet other embodiments of the invention, monitoring may be performed to determine contacts stored on the phone. Analysis may be performed to determine the contacts, geographic locations of the contacts, and the like. Based on these contacts, monitoring may be performed to determine which contacts the user typically communicates with. Such communications may include telephonic calls, SMS messages, video chats, social messaging, and the like.

Block 404 illustrates receiving, from the computing device, a baseline set of physical user patterns of the user for the purpose of identifying the user. As the computing device monitors the user patterns of the user, the computing device may communicate the user patterns to a system for identifying one or more routine actions. Using this baseline set of physical user patterns, an identification may be performed to determine one or more routine actions performed by the user while the user is operating the computing device, as illustrated in Block 406. Identifying the routine action is dependent upon the particular user pattern. Where the user pattern involves a counting, analysis may be performed to determine the number of times that the action was performed within a given period of time. For example, the system may determine how many times the user unlocks the computing device within a day. In identifying the user, multiple routine actions may be analyzed. As described above, monitoring may be performed on times of the day in which the user accesses a mobile device and the position that the user typically holds the mobile device. For example, in the morning a user may access the mobile device after waking up in the morning. The user would access the mobile device from a lying down position and holds the device accordingly. Therefore, an identification may be made that the user holds the device in a given manner in the morning.

Where the computing device stores contacts of the user and analysis is performed to determine the geographic location and other information of each of the contacts, the baseline information may include information about the contact data. Where communication is performed using the computing device, the baseline data may include frequent contacts of the user. Such analysis may be based on a number of communications that a user has with a given contact compared to a number of communications that the user has with other contacts.

Block 408 illustrates receiving a request from the user, to perform a transaction using the computing device, where the transaction is associated with a level of security. In some embodiments, the transaction may be associated with an application installed on the computing device. For example, a computing device may have a banking application installed which allows the user to perform financial transactions on a bank account. In other embodiments, the transaction may be associated with the computing device itself (e.g. unlocking the computing device, changing a setting).

In some embodiments, the level of security may comprise one or more credentials that must be authenticated prior to the execution of the function. The credentials may include a username, a password, a personal identification number (PIN), a security token, and the like. In some embodiments, the level of security associated with the transaction may be one of a hard authentication or a soft authentication, as defined herein.

Block 410 illustrates receiving, from the computing device an identification set of physical user patterns of the user. Similar to the baseline set of physical user patterns, the identification set of physical user patterns is based on the routine actions described herein. Additionally, these routine actions are monitored using the same methods and processes as described herein. For example, baseline data may indicate that a user typically spells given words incorrectly at a given percentage. Incoming data may suggest a deviation from the baseline data that the user typically spells incorrectly.

Block 412 illustrates determining a threshold score based on comparing the identification set of physical user patterns with the baseline set of physical user patterns. In some embodiments, the baseline set of physical user patterns are compared to the baseline set of physical user patterns. This comparison is dependent upon the user patterns being compared. For example, where the user pattern includes words typically misspelled by the user, the system may monitor how many times a given word is misspelled within a predetermined period of time compared to a baseline reading. Such comparison may include statistical analysis in determining the threshold score.

In some embodiments, the threshold score is categorized into one of multiple tiers. The tiers might include a tier for full authentication, a tier for partial authentication, and a tier for no authentication. In block 414, an alteration of the level of security may be performed based on the tier to which the threshold score has been categorized. If the threshold score was categorized into the full authentication tier, the level of security may be altered to require the user submit no credentials prior to performing the transaction. If the threshold score was categorized into the partial authentication tier, the level of security may be altered to require the user submit some or all of the credentials associated with the level of security. For example, a level of security may require the user submit a username and a password prior to performing the transaction. Based on the threshold score being categorized in the partial authentication tier, the level of authentication may be altered such that the user may only be required to enter into the password prior to performing the transaction. Where the threshold score is categorized into the no authentication tier, the level of security may be altered such that the user may be required to submit at least all of the credentials associated with the level of security. In some embodiments the level of security may be altered such that the user may be required to submit additional credentials in addition to the credentials associated with the level of security. For example, a level of security may require a user submit a username and password prior to completing a transaction. Based on a threshold score being categorized into a tier of no authentication, a user may be required to submit the username and password, and a personal identification number (PIN) prior to the transaction being executed.

In other embodiments, where the level of security is associated with a hard or a soft authentication level, the level of security may be altered to lower the authentication level lower than an original level of level of security. For example, if the level of security is associated with a hard authentication, the level of security may be altered to be associated with a soft authentication. Additionally, if the level of security is associated with a soft authentication, the level of security may be altered to be associated with no authentication.

In addition to altering the level of security, a system performing the steps described herein may be further configured to communicate a request for the user to submit a response to one or more credentials associated with the level of security or an altered level of security. Based on communicating such a request, a user may submit a response that includes the one or more credentials associated with the level of security or the altered level of security. After receiving the credentials, the system may authenticate user based on validating the one or more credentials. Finally, after validating the user, the system may perform the transaction.

If the user is required to submit credentials associated with the level of security or the altered level of security, the system may update the baseline set of physical user patterns using the identification set of physical user patterns. The system updates the baseline set of physical user patterns after authenticating the user. Thus, the system continuously learns patterns associated with the user. When the system does not recognize a pattern of the user, the system requests the user submit credentials to authenticate the user and then updates the baseline set of patterns based on new patterns.

In yet another embodiment of the invention, the invention may be configured to receive from a user, a request to execute at least one user action from a plurality of user actions associated with an application. Execution of the at least one user action requires validation of one or more authentication credentials.

The invention may collect a set of data comprising information related to one or more physical user patterns. Such physical user patterns may be based on the user physically interacting with an apparatus. Based on the collected set of data, the invention may determine a normal pattern of usage.

After determining the normal pattern of usage of the user, the invention may then determine a present pattern of usage. The present pattern of usage may be based again on the user physically interacting with the apparatus.

Using the normal pattern of usage and the present pattern of usage, the invention may determine a user pattern score of the user. The invention may determine the user pattern score by comparing the present pattern of usage to the normal pattern of usage. By using such a comparison, the invention may determine that the present pattern of usage is outside the normal pattern of usage. The invention sets the user pattern score by determining an extent to which the present pattern of usage is outside the normal pattern of usage.

Using the determined user pattern score, the invention may determine a level of security associated with the determined user pattern score and further determine which one or more authentication types from a plurality of authentication types are associated with the level of security associated with the user pattern score.

Based on the level of security, the invention may request one or more authentication credentials corresponding to the determined one or more authentication types and may receive one or more authentication credentials from the user. The invention may validate the one or more authentication credentials, thereby resulting in a successful validation of the one or more authentication credentials.

In response to the successful validation of the one or more authentication credentials, the invention may execute the at least one user action.

Although many embodiments of the present invention have just been described herein, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/928,360 now published as 2016/0055487 | DETERMINING USER AUTHENTICATION BASED ON USER PATTERNS WITHIN APPLICATION | Concurrently herewith |
| 14/928,154 now | PASSIVE BASED SECURITY | Concurrently herewith |
| U.S. Pat. No. 9,641,539 | ESCALATION TO SHUT OFF OF APPLICATION BASED ON RULES EVENT TRIGGERING | Concurrently herewith |
| 14/928,161 now published as 2017/0126639 | PERMANENTLY AFFIXED UN-DECRYPTABLE IDENTIFIER ASSOCIATED WITH MOBILE DEVICE | Concurrently herewith |
| 14/928,498 now published as 2017/0127275 | INTEGRATED FULL AND PARTIAL SHUTDOWN APPLICATION PROGRAMMING INTERFACE | Concurrently herewith |
| 14/928,392 now | TIERED IDENTIFICATION | Concurrently herewith |
| U.S. Pat. No. 9,729,536 | FEDERATED AUTHENTICATION NETWORK SYSTEM | Concurrently herewith |

What is claimed is:

1. An apparatus for user authentication based on user/device interactions, the apparatus comprising:
  a memory;
  one or more processors; and
  a security module stored in the memory, executable by the one or more processors, and configured to cause the one or more processors to:
    communicate, to a computing device, code executable by the computing device that causes the computing device to monitor user patterns of a user based on the user physically interacting with the computing device;
    receive, from the computing device, a baseline set of physical user patterns of the user for identifying the user, wherein the physical user patterns of the user comprise a manner in which the user performs correction of typing errors;
    identify, from the baseline set of physical user patterns, one or more routine actions performed by the user while physically interacting with the computing device;
    receive, from the user, a request to perform a transaction using the computing device, wherein the transaction is associated with a level of security that must be authenticated prior to completing the transaction;
    receive, from the computing device, an identification set of physical user patterns of the user based on the user physically interacting with the computing device;
    determine a threshold score based on comparing the identification set of physical user patterns with the baseline set of physical user patterns;
    based on the threshold score, alter the level of security that must be authenticated prior to completing the transaction;
  cause the one or more processors to update the baseline set of physical user patterns using the identification set of physical user patterns based on successfully validating one or more authentication credentials associated with the level of security;

communicate a request for the user to submit a response to one or more credentials associated with the level of security;

receive the response to the one or more credentials associated with the level of security;

authenticate the user based on validating the response to the one or more credentials associated with the level of security; and perform the transaction based on authenticating the user.

2. The apparatus of claim 1, wherein the level of security that must be authenticated prior to completing the transaction is one of a hard authentication and a soft authentication, wherein the hard authentication comprises two or more authentication credentials, and wherein the soft authentication comprises one authentication credential.

3. The apparatus of claim 2, wherein altering the level of security that must be authenticated prior to completing the transaction comprises changing the level of security, if the level of security is the hard authentication, from the hard authentication to the soft authentication, or changing the level of security, if the level of security is the soft authentication to no authentication.

4. The apparatus of claim 1, wherein the threshold score is associated with one of a fully authenticated tier, a partially authenticated tier, and no authenticated tier, wherein altering the level of security when the threshold score is associated with the fully authenticated tier comprises requiring no authentication credentials prior to performing the transaction, wherein altering the level of security when the threshold score is associated with the fully authenticated tier comprises requiring at least a partial number of the authentication credentials associated with the level of security prior to completing the transaction, and wherein altering the level of security when the threshold score is associated with the fully authenticated tier comprises requiring all of the authentication credentials associated with the level of security and at least one other authentication credential not associated with the level of security.

5. The apparatus of claim 1, wherein the physical user patterns of the user further comprise at least one of a time of day when the user physically interacts with the computing device or specific applications stored on the computing device that the user accesses, an order in which the user accesses the specific applications stored on the computing device, an angle at which the user holds the computing device captured by the computing device using an accelerometer, contacts stored on the computing device, and the like.

6. The apparatus of claim 1, wherein the security module is further configured to cause the one or more processors to update the baseline set of physical user patterns using the identification set of physical user patterns based on receiving validating one or more authentication credentials associated with the level of security.

7. A method for user authentication based on user/device interactions, the method comprising:

communicating, to a computing device, code executable by the computing device that causes the computing device to monitor user patterns of a user based on the user physically interacting with the computing device;

receiving, from the computing device, a baseline set of physical user patterns of the user for identifying the user, wherein the physical user patterns of the user comprise a manner in which the user performs correction of typing errors;

identifying, from the baseline set of physical user patterns, one or more routine actions performed by the user while operating the computing device;

receiving, from the user, a request to perform a transaction using the computing device, wherein the transaction is associated with a level of security that must be authenticated prior to completing the transaction;

receiving, from the computing device, an identification set of physical user patterns of the user based on the user physically interacting with the computing device;

determining a threshold score based on comparing the identification set of physical user patterns with the baseline set of physical user patterns;

based on the threshold score, altering the level of security that must be authenticated prior to completing the transaction;

cause the one or more processors to update the baseline set of physical user patterns using the identification set of physical user patterns based on successfully validating one or more authentication credentials associated with the level of security;

cause the one or more processors to update the baseline set of physical user patterns using the identification set of physical user patterns based on successfully validating one or more authentication credentials associated with the level of security;

communicate a request for the user to submit a response to one or more credentials associated with the level of security;

receive the response to the one or more credentials associated with the level of security;

authenticate the user based on validating the response to the one or more credentials associated with the level of security; and perform the transaction based on authenticating the user.

8. The method of claim 7, wherein the level of security that must be authenticated prior to completing the transaction is one of a hard authentication and a soft authentication, wherein the hard authentication comprises two or more authentication credentials, and wherein the soft authentication comprises one authentication credential.

9. The method of claim 8, wherein altering the level of security that must be authenticated prior to completing the transaction comprises changing the level of security, if the level of security is the hard authentication, from the hard authentication to the soft authentication, or changing the level of security, if the level of security is the soft authentication to no authentication.

10. The method of claim 7, wherein the threshold score is associated with one of a fully authenticated tier, a partially authenticated tier, and no authenticated tier, wherein altering the level of security when the threshold score is associated with the fully authenticated tier comprises requiring no authentication credentials prior to performing the transaction, wherein altering the level of security when the threshold score is associated with the fully authenticated tier comprises requiring at least a partial number of the authentication credentials associated with the level of security prior to completing the transaction, and wherein altering the level of security when the threshold score is associated with the fully authenticated tier comprises requiring all of the authentication credentials associated with the level of security and at least one other authentication credential not associated with the level of security.

11. The method of claim 7, wherein the physical user patterns of the user comprise at least one of a time of day when the user physically interacts with the computing device or specific applications stored on the computing device that the user accesses, an order in which the user accesses the specific applications stored on the computing device, an angle at which the user holds the computing device captured by the computing device using an accelerometer, contacts stored on the computing device, and the like.

12. The method of claim 7, wherein the method further comprises updating the baseline set of physical user patterns using the identification set of physical user patterns based on receiving validating one or more authentication credentials associated with the level of security.

13. A computer program product for user authentication based on user/device interactions, the computer program product comprising a non-transitory computer-readable medium comprising code causing a first apparatus to:
   communicate, to a computing device, code executable by the computing device that causes the computing device to monitor user patterns of a user based on the user physically interacting with the computing device;
   receive, from the computing device, a baseline set of physical user patterns of the user for identifying the user, wherein the physical user patterns of the user comprise a manner in which the user performs correction of typing errors;
   identify, from the baseline set of physical user patterns, one or more routine actions performed by the user while operating the computing device;
   receive, from the user, a request to perform a transaction using the computing device, wherein the transaction is associated with a level of security that must be authenticated prior to completing the transaction;
   receive, from the computing device, an identification set of physical user patterns of the user based on the user physically interacting with the computing device;
   determine a threshold score based on comparing the identification set of physical user patterns with the baseline set of physical user patterns;
   based on the threshold score, alter the level of security that must be authenticated prior to completing the transaction;
   cause the one or more processors to update the baseline set of physical user patterns using the identification set of physical user patterns based on successfully validating one or more authentication credentials associated with the level of security;
   cause the one or more processors to update the baseline set of physical user patterns using the identification set of physical user patterns based on successfully validating one or more authentication credentials associated with the level of security;
   communicate a request for the user to submit a response to one or more credentials associated with the level of security;
   receive the response to the one or more credentials associated with the level of security;
   authenticate the user based on validating the response to the one or more credentials associated with the level of security; and
   perform the transaction based on authenticating the user.

14. The computer program product of claim 13, wherein the level of security that must be authenticated prior to completing the transaction is one of a hard authentication and a soft authentication, wherein the hard authentication comprises two or more authentication credentials, and wherein the soft authentication comprises one authentication credential.

15. The computer program product of claim 14, wherein altering the level of security that must be authenticated prior to completing the transaction comprises changing the level of security, if the level of security is the hard authentication, from the hard authentication to the soft authentication, or changing the level of security, if the level of security is the soft authentication to no authentication.

16. The computer program product of claim 13, wherein the threshold score is associated with one of a fully authenticated tier, a partially authenticated tier, and no authenticated tier,
   wherein altering the level of security when the threshold score is associated with the fully authenticated tier comprises requiring no authentication credentials prior to performing the transaction,
   wherein altering the level of security when the threshold score is associated with the fully authenticated tier comprises requiring at least a partial number of the authentication credentials associated with the level of security prior to completing the transaction, and
   wherein altering the level of security when the threshold score is associated with the fully authenticated tier comprises requiring all of the authentication credentials associated with the level of security and at least one other authentication credential not associated with the level of security.

17. The computer program product of claim 13, wherein the physical user patterns of the user comprise at least one of a time of day when the user physically interacts with the computing device or specific applications stored on the computing device that the user accesses, an order in which the user accesses the specific applications stored on the computing device, an angle at which the user holds the computing device captured by the computing device using an accelerometer, contacts stored on the computing device, and the like.

18. A system for user authentication to perform at least one user action of a plurality of user actions associated with an application running on an apparatus and based on user/device interactions patterns, the system comprising:
   a memory;
   one or more processors; and
   computer-executable instructions stored in the memory, executable by the one or more processors, and configured to cause the one or more processors to:
      receive from a user, a request to execute the at least one user action from a plurality of user actions associated with an application, wherein execution of the at least one user action requires validation of one or more authentication credentials;
      collect a set of data comprising information related to one or more physical user patterns based on the user physically interacting with an apparatus, wherein the physical user patterns of the user comprise a manner in which the user performs correction of typing errors;

determine a normal pattern of usage based on the collected set of data;

determine a present pattern of usage based on the user physically interacting with the apparatus;

determine a user pattern score of the user, comprising:
  comparing the present pattern of usage to the normal pattern of usage;
  determining that the present pattern of usage is outside the normal pattern of usage;
  setting the user pattern score by determining an extent to which the present pattern of usage is outside the normal pattern of usage;

determine a level of security associated with the determined user pattern score;

determine which one or more authentication types from a plurality of authentication types are associated with the level of security associated with the user pattern score;

request one or more authentication credentials corresponding to the determined one or more authentication types;

receive one or more authentication credentials from the user;

validate the one or more authentication credentials, thereby resulting in a successful validation of the one or more authentication credentials;

in response to the successful validation of the one or more authentication credentials, execute the at least one user action;

cause the one or more processors to update the baseline set of physical user patterns using the identification set of physical user patterns based on successfully validating one or more authentication credentials associated with the level of security;

cause the one or more processors to update the baseline set of physical user patterns using the identification set of physical user patterns based on successfully validating one or more authentication credentials associated with the level of security;

communicate a request for the user to submit a response to one or more credentials associated with the level of security;

receive the response to the one or more credentials associated with the level of security;

authenticate the user based on validating the response to the one or more credentials associated with the level of security; and perform the transaction based on authenticating the user.

\* \* \* \* \*